(12) United States Patent
Knappe et al.

(10) Patent No.: US 6,946,411 B2
(45) Date of Patent: Sep. 20, 2005

(54) METHOD AND SYSTEM FOR IMPROVING THE EFFICIENCY OF A MECHANICAL ALIGNMENT TOOL

(75) Inventors: Uwe Knappe, Niemtsch (DE); Jan Raebiger, Dresden (DE); Uwe Schulze, Dresden (DE); Rolf Seltmann, Dresden (DE)

(73) Assignee: Advanced Micro Devices, Inc., Austin, TX (US)

( * ) Notice: Subject to any disclaimer, the term of this patent is extended or adjusted under 35 U.S.C. 154(b) by 196 days.

(21) Appl. No.: 10/621,663

(22) Filed: Jul. 17, 2003

(65) Prior Publication Data

US 2004/0167640 A1 Aug. 26, 2004

(30) Foreign Application Priority Data

Feb. 21, 2003 (DE) .......................................... 103 07 527

(51) Int. Cl.⁷ .............................................. H01L 21/00
(52) U.S. Cl. ....................................... 438/800; 438/907
(58) Field of Search ........................... 438/16, 258, 410, 438/800, 907

(56) References Cited

U.S. PATENT DOCUMENTS 6,813,000 B1 * 11/2004 Nishi ........................... 355/53
2002/0016646 A1    2/2002 Kim ............................ 700/121

* cited by examiner

Primary Examiner—Phuc T. Dang
(74) Attorney, Agent, or Firm—Williams, Morgan & Amerson, P.C.

(57) ABSTRACT

A technique is disclosed that allows alignment of substrates on a run-to-run basis by using the position data of one or more previously aligned substrates to determine a setpoint of a pre-alignment process for one or more subsequent substrates. The setpoint may also be determined on the basis of a predefined characteristic of the substrates to be aligned.

31 Claims, 1 Drawing Sheet

METHOD AND SYSTEM FOR IMPROVING THE EFFICIENCY OF A MECHANICAL ALIGNMENT TOOL

BACKGROUND OF THE INVENTION

1. Field of the Invention

The present invention relates to the field of fabrication of integrated circuits, and, more particularly, to a technique for mechanically aligning a substrate with respect to a process tool, such as a photolithography tool.

2. Description of the Related Art

Fabrication of integrated circuits requires the precise formation of very small features with a very small tolerance for error. Such features may be formed in a material layer formed above an appropriate substrate, such as a silicon substrate. These features of precisely controlled size are generated by patterning the material layer by performing known photo-lithography and etching processes, wherein a masking layer is formed over the material layer to be treated to define these features. Generally, a masking layer may consist of or is formed by means of a layer of photoresist that is patterned by a lithographic process. During the lithographic process, the resist may be spin-coated onto the wafer surface and is then selectively exposed to ultraviolet radiation. After developing the photoresist, depending on the type of resist, positive resist or negative resist, the exposed portions or the non-exposed portions are removed to form the required pattern in the layer of photoresist. Since the dimensions of the patterns in sophisticated integrated circuits are steadily decreasing, the equipment used for patterning device features have to meet very stringent requirements with regard to resolution and overlay accuracy of the involved fabrication processes. In this respect, resolution is considered as a measure specifying the consistent ability to print images of a minimum size under conditions of pre-defined manufacturing variations. One important factor in improving the resolution is represented by the lithographic process, in which patterns contained in a photo mask or reticle are optically transferred to the layer of photo-resist via an optical imaging system. Therefore, great efforts are made to steadily improve optical properties of the lithographic system, such as numerical aperture, depth of focus and wavelength of the light source used. The quality of the lithographic imagery is extremely important in creating very small feature sizes.

Of at least comparable importance, however, is the accuracy with which an image can be positioned on the surface of the substrate. Integrated circuits are typically fabricated by sequentially patterning material layers, wherein features on successive material layers bear a spatial relationship to one another. Each pattern formed in a subsequent material layer has to be aligned to a corresponding pattern formed in the previously patterned material layer within specified registration tolerances.

These registration tolerances are caused by, for example, a variation of a photoresist image on the substrate due to non-uniformities in such parameters as resist thickness, baking temperature, exposure and development. Furthermore, non-uniformities of the etching processes can also lead to variations of the etched features. In addition, there exists an uncertainty in overlaying the image of the pattern for the current material layer to the pattern of the previously formed material layer while photolithographically transferring the image onto the substrate. Several factors determine the ability of the imagery system to overlay two layers, i.e., the existing layer and the layer to be transferred from the reticle to the substrate, such as imperfections within a set of masks, temperature differences at the different times of exposure, and a limited alignment capability of the alignment tool, which is commonly a part of the photolithography tool.

In commonly available photolithography tools, such as steppers that accomplish exposure of substrates in a step-and-repeat process, the substrates are typically aligned in a two-step procedure, wherein first in a so-called pre-alignment, a coarse orientation of the substrate is achieved in that prominent positions of the substrate, located, for example, at the substrate edge, are adjusted such that alignment marks within the substrate are positioned within a specified capture range of a fine alignment system. Then, in a subsequent fine alignment, the actual registration of the substrate, or portions thereof when a die-by-die: alignment is required, is accomplished. During the two-step alignment, the substrate is placed on a substrate stage and is then aligned by, for example, a two-dimensional translation and a rotation in the plane defined by the two-dimensional translations, with respect to tool specific alignment marks. The accuracy of the alignment depends on, among other things, how the incoming substrate is placed on the substrate stage. This process may provide appropriate precision when the pre-alignment process is able to position the substrate with a sufficient degree of precision that allows the subsequent fine alignment routines to obtain the finally required accuracy. Thus, when the pre-alignment leads to an alignment result not falling within a specified process "window," a process abort may result, since the fine alignment procedure may not be able to locate alignment marks on the substrate, thereby significantly reducing the throughput of the lithography tool. In other cases, an inappropriate pre-alignment may entail a significant alignment error owing to a certain "periodicity" of the fine alignment procedure, yet resulting in a precise orientation, however, with a considerable translatory offset corresponding to the periodicity. Consequently, reworking of the substrate is required when the alignment error is detected by inspection, or a failure in subsequent processes may occur when the misalignment remains undetected. In either case, the throughput of the lithography tool is considerably reduced.

The pre-alignment process may be based on tool specific constants, such as offset values for the tool focus, basic settings for sensor and actuator elements, and the like. These constants may be determined during a qualification process, thereby possibly taking into account a specified type of substrates having experienced a specified one or more process sequences. However, a parameter drift in the tool and/or variations on the substrate side may lead to significant variations of the alignment procedure and thus entail the above-discussed disadvantages.

In view of this situation, it is desirable to provide a technique for aligning substrates on the basis of alignment tool specific and substrate specific parameters, wherein a parameter drift may be compensated for or at least be considerably reduced.

SUMMARY OF THE INVENTION

Generally, the present invention is directed to a technique in which at least one tool constant that is relevant for the alignment procedure is updated during the processing of a batch of substrates on the basis of at least one previously used value of the tool constant to thereby compensate tool-related parameter drifts. Moreover, at least one substrate specific characteristic may be taken into account to thereby also reduce substrate specific parameter drifts.

According to one illustrative embodiment of the present invention, a method of aligning a substrate comprises obtaining first position data indicating a position of a first substrate having a predefined characteristic after an alignment act of the first substrate. Then, a setpoint is determined for aligning a second substrate on the basis of the first position data and the predefined characteristic. Finally, the second substrate is aligned on the basis of the determined setpoint.

According to another illustrative embodiment of the present invention, a method of aligning a substrate comprises determining an input value of a first variable indicating a motion of a first substrate having a predefined characteristic during an alignment act of the first substrate. A setpoint for a second variable is determined on the basis of the first variable and the predefined characteristic, wherein the second variable indicates a motion of the second substrate during an initial phase of aligning the second substrate. Finally, the second substrate is aligned on the basis of the determined setpoint.

According to still another illustrative embodiment of the present invention, an automatic alignment system comprises a substrate stage configured to receive and hold in place a substrate and a drive assembly that is mechanically coupled to the substrate stage and configured to initiate a motion of the substrate stage in response to a control signal. The alignment system further comprises a control unit configured to provide the control signal to the drive assembly. The control unit is further configured to establish the control signal on the basis of a predefined characteristic of a substrate to be aligned and position data obtained from one or more substrates previously aligned by the alignment tool.

BRIEF DESCRIPTION OF THE DRAWINGS

The invention may be understood by reference to the following description taken in conjunction with the accompanying drawings, in which like reference numerals identify like elements, and in which.

Figure 1:
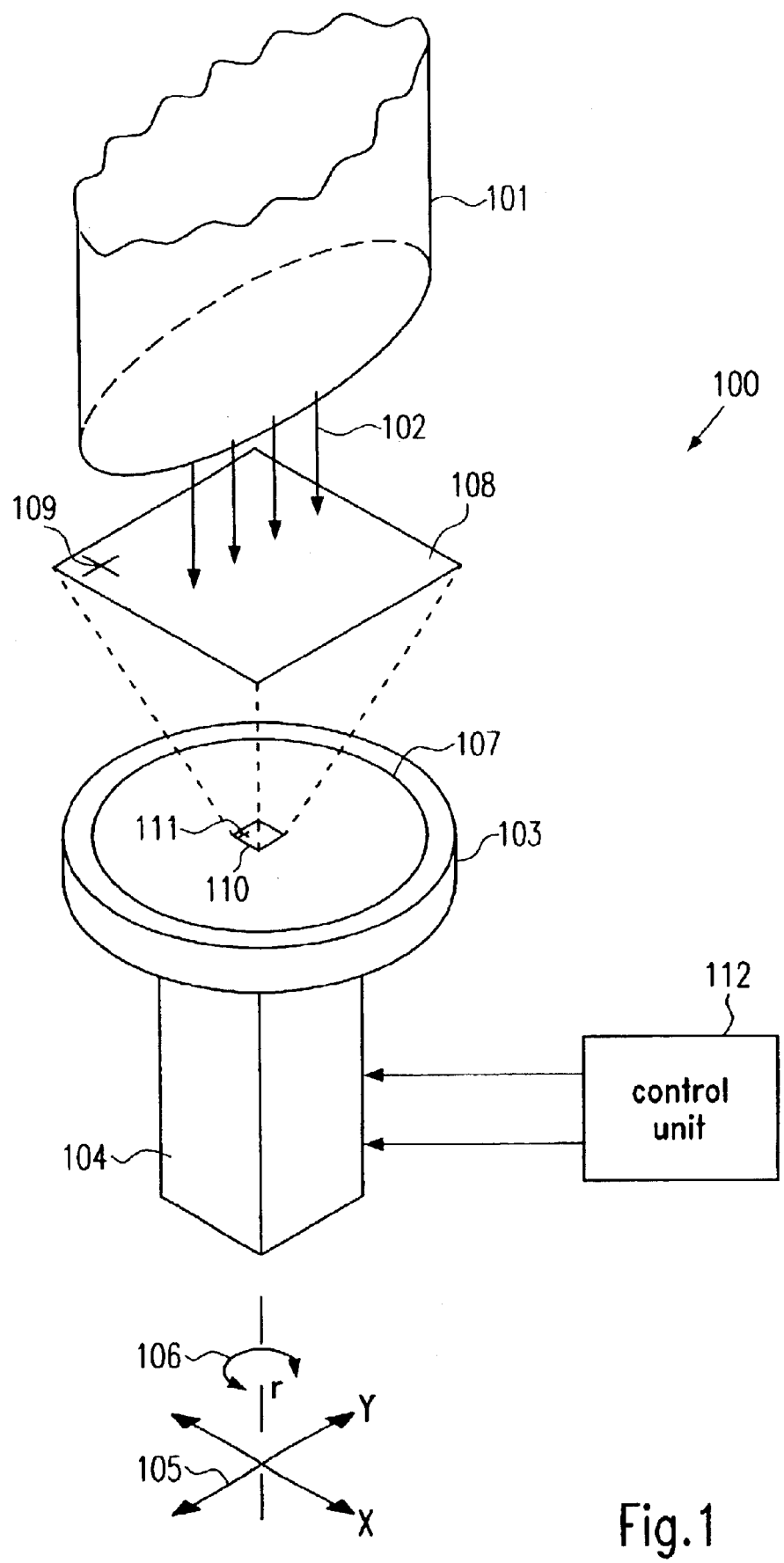
FIG. 1 schematically shows a metrology system adapted to perform an overlay accuracy measurement in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with, reference to the attached figures. Although the various regions and structures of a semiconductor device are depicted in the drawings as having very precise, sharp configurations and profiles, those skilled in the art recognize that, in reality, these regions and structures are not as precise as indicated in the drawings. Additionally, the relative sizes of the various features and doped regions depicted in the drawings may be exaggerated or reduced as compared to the size of those features or regions on fabricated devices. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In the following illustrative embodiments, the present invention is disclosed in the specific context of its use with a photolithography tool, such as a stepper, since the present invention is particularly advantageous in lithography processes to significantly increase tool efficiency due to an improved alignment technique. However, the present invention may be applied as well to other tools used during the production and/or inspection of substrates. For instance, in some metrology tools, such as scanning electron microscopes, scatterometers, and the like, valuable and sensitive measurement data may be obtained, wherein the demand for a high tool utilization calls for highly automated processes for substrate loading and aligning. Thus, the speed and efficiency of the alignment process may significantly improve throughput of the tools and thus allow more powerful process control due to an increased number of measurements per time.

With reference to FIG. 1, further illustrative embodiments will now be described. FIG. 1 provides a schematic perspective view of a photolithography tool 100. The photolithography tool 100 is comprised of an optical system 101 that is configured to provide a light beam 102 of specified characteristics required for imaging a pattern onto a substrate. The optical system 101 may include an appropriate light source (not shown), a large number of complex optical components, such as lenses and mirrors, to define an optical path for the light beam 102. Typically, a wavelength of the light used may be in the deep ultraviolet range, for example at 248 nm. In future tool generations, however, even shorter wavelengths may be used, wherein the optical components may correspondingly be adapted to these shorter wavelengths, by, for example, replacing refractive components by reflecting components. A substrate stage 103 is mechanically connected to a drive assembly 104, which in the present example is configured to be able to translate in two orthogonal directions, as indicated by reference sign 105, and to rotate, as indicated by 106, in a plane defined by the two translatory motions 105. In other embodiments, however, any number of degrees of freedom may be provided by the drive assembly 104. For example, a three-dimensional translatory movement may be provided and/or rotational or tilt motions in two or more different planes may be required for a precise alignment of a substrate 107 located on the substrate stage 103.

A reticle 108 is located in the optical path of the light beam 102 and includes an alignment mark 109 that represents a tool-internal coordinate system to which the substrate 107 or portions thereof is to be aligned. For convenience, any means necessary for handling and holding the reticle 108 are not shown. In tools other than the photolithography tool 100, for example, in a metrology instrument, the tool-internal coordinate system may be represented by any other alignment mark that allows the positioning of the substrate 107 with respect to the tool.

As shown, the substrate 107 may include at least one portion 110 having formed therein an alignment mark 111 that substantially corresponds to the alignment mark 109. In the example shown, the alignment marks 109 and 111 are of simple configuration, wherein, in other embodiments, the alignment marks 109 and 111 may have a more or less complex structure that enables an alignment within a predefined tolerance. Usually, the alignment mark 111 has dimensions and an internal structure, as well as optical characteristics, that are related to the circuit patterns to be transferred from the reticle 108 to the substrate portion 110 and process sequences performed during the manufacturing of the layer(s) including the portion 110. Thus, the ability of an automatic alignment procedure may depend on these characteristics. Furthermore, the structure, dimensions and characteristics of the alignment mark 111 may also affect a so-called capture range of a fine alignment system, which may be comprised of parts of the optical system 101, the drive assembly 104 and a control unit 112 that is operatively connected to the drive assembly 104 and possibly to other components of the tool 100. In other embodiments, the fine alignment system may include separate and/or additional components (not shown). The control unit 112 may further be configured to operate the tool 100 and in particular the drive assembly 104 on the basis of positioning data used during aligning of one or more previously processed substrates and on the basis of one or more substrate characteristics, as will be described in more detail later on.

During operation, the substrate 107 is loaded on the substrate stage 103 by a corresponding substrate handler (not shown), wherein the location and orientation of the substrate 107 with respect to the substrate stage 103 may depend on various parameters, such as of the substrate 107 relative to a cassette, the slot, in which the substrate 107 is placed within the cassette, tolerances caused during the substrate loading, and the like. Due to the limited ability of finely aligning the substrate 107, i.e., aligning the alignment mark 111 relative to the alignment mark 109, the substrate 107 has to be positioned on the substrate stage 103 within specified margins, also referred to as a pre-alignment window. Consequently, a pre-alignment procedure is carried out to coarsely align the substrate 107 by using pre-alignment characteristics of the substrate 107, such as a notch formed on the substrate perimeter or other marks, e.g., wafer flats, preferably formed at peripheral regions of the substrate 107, which may easily be identified by the optical system 101 or other optical or mechanical sensor elements (not shown) that communicate with the control unit 112.

In a conventional device, the control unit 112 typically determines the translation 105 of the substrate stage 103 and/or the rotation 106 during the coarse alignment on the basis of fixed setpoints. The control unit 112 is configured to update one or more setpoints for the motions during the pre-alignment on a regular basis. As previously noted, the setpoints are conventionally determined by qualification procedures, thereby adjusting tool specific constants, such as electrical and/or mechanical variations of actuators, sensor elements, optical elements, and the like. In sophisticated integrated circuits, minimal overlay errors of some nanometers are required. Even minor tool variations may lead to an increased pre-alignment inaccuracy that may not allow as satisfactory fine alignment as is necessary for meeting the process specifications. Therefore, the setpoint(s) for the motions during pre-alignment are updated by taking advantage of the fact that positioning data gathered after a successful alignment of one or more previously finely aligned substrates may be used to redefine the setpoint(s) for the pre-alignment process.

In one embodiment, for each setpoint used for the pre-alignment, a corresponding target value is established, wherein the target value also includes one or more substrate specific characteristics, such as type of substrate, type of process sequence carried out during the formation of the alignment mark 111, type of reticle used, and the like. For example, a certain type of alignment mark 111 formed in or on a specified material layer may require a more restricted range of motions during the pre-alignment to ensure a successful fine alignment compared to other substrate levels, which provide for alignment marks exhibiting improved contrast and thus enhanced likelihood of correctly identifying the aligmnent marks. Thus, the target values may represent the desired values for an appropriate pre-alignment window with respect to a given substrate characteristic.

Without intending to limit the present invention to a particular type and number of degrees of freedom, unless otherwise explicitly set forth in the appended claims, the motions performed during the alignment of the substrate 107 may be referred to as x and y movements for the two orthogonal translatory motions 105 and as r for the rotation 106. The setpoints for the pre-alignment motions in these directions may be indicated by X, Y, R, respectively, wherein an index "first" may be used for a pre-alignment setpoint of a previously processed substrate, and an index "second" for the setpoint of the pre-alignment motions for the substrate 107 that is to be aligned. The target values for the setpoints may be denoted by $X_{t,k}$, $Y_{t,k}$ and $R_{t,k}$, wherein the index k relates to the substrate specific characteristic, and may represent the layer including the alignment mark 111 and the layer to be formed on and/or by means of the alignment mark 109 in the reticle 108. Thus, $X_{first}$, $Y_{first}$, $R_{first}$ represent the setpoints for pre-alignment of a previous, first substrate, $X_{second}$, $Y_{second}$, $R_{second}$ represent updated setpoints for the pre-alignment of the substrate 107, that is, the second substrate, and $X_{t,k}$, $Y_{t,k}$, $R_{t,k}$ represent the target values ensuring a pre-alignment within the capture range of the fine alignment, thereby taking into account the substrate characteristics.

In one embodiment, the updated setpoints are determined by using the position data of the first (previous) substrate(s) as "measurement" data or input data, wherein the first substrate is assumed to have been properly aligned by the fine alignment algorithm implemented in the control unit 112. In some embodiments, the input data may be obtained from a plurality of first substrates, for example, from a previously processed lot by appropriately averaging the data or by selecting corresponding input values in accordance with certain selection criteria specifying a suitable candidate. For instance, values having a significant deviation from the plurality of data may be ignored, thereby minimizing the risk to include data of incorrectly aligned substrates. However, any other suitable selection criteria may be applied when a plurality of first substrates is used. The position data for the one or more first substrates may be denoted by $x_{first}$, $y_{first}$, $r_{first}$, wherein it is to be borne in mind that these position data are related to the substrate characteristic k and is for convenience not indexed in the position data.

For determining the updated setpoints $X_{second}$, $Y_{second}$, $R_{second}$ for properly pre-aligning the (second) substrate 107, a relationship may be established relating the input data $x_{first}$, $y_{first}$, $r_{first}$ to updated setpoints $X_{second}$, $Y_{second}$, $R_{second}$ and the previously used setpoints $X_{first}$, $Y_{first}$, $R_{first}$ such that a drift of the input data $x_{first}$, $y_{first}$, $r_{first}$, indicating a tool and/or substrate specific variation may be compensated for by correspondingly redefining the setpoints $X_{first}$, $Y_{first}$, $R_{first}$ to obtain the updated setpoints $X_{second}$, $Y_{second}$, $R_{second}$ accounting for the parameter variation. A corresponding relationship may be established by experiment, for instance by monitoring the alignment accuracy for a large number of substrates and analyzing the corresponding data to obtain a correlation between the input data and the setpoints for the pre-alignment.

In one particular embodiment, a model is used to find a relation between the input data $x_{first}$, $y_{first}$, $r_{first}$ and the updated setpoints $X_{second}$, $Y_{second}$, $R_{second}$ to be used for pre-aligning the substrate 107. In one illustrative embodiment, a linear model may be used, wherein the individual motions corresponding to the individual degrees of freedom are not mixed. A corresponding relationship in a linear model may take on the following form:

$$x_{second} = x_{first} + a(X_{second} - X_{first})$$

$$y_{second} = y_{first} + b(Y_{second} - Y_{first})$$

$$r_{second} = r_{first} + c(R_{second} - R_{first}),$$

wherein $x_{second}$, $y_{second}$ and $r_{second}$, respectively, represent the position data for aligning the (second) substrate 107. The parameters a, b and c may represent sensitivity parameters for quantitatively describing the "effect" of a change in the setpoint to the alignment operation. For instance, the parameters a, b and c may be selected as 1. In other embodiments, one or more of the sensitivity parameters may be less than 1 to "dampen" the effect of the pre-alignment on the entire alignment process, whereas, in other variants, one or more sensitivity parameters may be higher than 1 to enhance the influence of the pre-alignment process.

In order to determine the updated setpoints $X_{second}$, $Y_{second}$, $R_{second}$, fictitious optimal setpoints for the first substrate, indicated as $X^*$, $Y^*$ and $R^*$, respectively, may be calculated by using the target values $X_{t,k}$, $Y_{t,k}$ and $R_{t,k}$ for the pre-alignment setpoints according to the above specified model. Thus, solving the following equation:

$$X_{t,k} = x_{first} + a(X^* - X_{first})$$

$$Y_{t,k} = y_{first} + b(Y^* - Y_{first})$$

$$R_{t,k} = r_{first} + c(R^* - R_{first}),$$

may yield the optimal settings for the pre-alignment operation of the first (previous) substrate. From the above fictitious optimal setpoints $X^*$, $Y^*$ and $R^*$ of the first substrate, respective estimates for the setpoints for the pre-alignment of the substrate 107 may be predicted by assuming a relationship between the setpoints $X_{first}$, $Y_{first}$, $R_{first}$ actually employed in aligning the first substrate and the calculated fictitious optimal setpoints $X^*$, $Y^*$ and $R^*$ on the one hand, and the behavior of the pre-alignment process for the substrate 107, i.e., the setpoints $X_{second}$, $Y_{second}$, $R_{second}$ on the other hand. According to one illustrative embodiment, an exponentially weighted moving average (EWMA) operation may be used to provide estimated setpoints for the substrate 107, indicated as $\tilde{X}_{second}$, $\tilde{Y}_{second}$, $\tilde{R}_{second}$, wherein the weighing factors may be determined in advance, for example, by experiment or simply by selecting them based on experience. The estimated setpoints may be obtained from the following equation:

$$\tilde{X}_{second} = \lambda X^* + (1-\lambda) X_{first}$$

$$\tilde{Y}_{second} = \mu Y^* + (1-\mu) Y_{first}$$

$$\tilde{R}_{second} = \nu R^* + (1-\nu) R_{first},$$

wherein the coefficients $\lambda$, $\mu$ and $\nu$ represent the weighing factors taking on values in the range from 0 . . . 1, thereby determining the amount of influence of the previously actually used setpoints $X_{first}$, $Y_{first}$, $R_{first}$ with respect to the calculated optimal setpoints $\tilde{X}_{second}$, $\tilde{Y}_{second}$, $\tilde{R}_{second}$. The coefficients $\lambda$, $\mu$ and $\nu$, therefore, also affect the "speed" at which the pre-alignment process for the substrate 107 "responds" to a deviation of the actual setpoints from the setpoints that would have been optimal in pre-aligning the first substrate. For instance, a value $\lambda=1$ would cause an immediate response to a deviation of the actual setpoint and the optimal setpoint without taking into consideration the "history" of preceding alignment processes, which is represented by the actually used setpoint $X_{first}$. Thus, in some embodiments, it may be advantageous to select the coefficients from the range of approximately 0.1 to 0.9, and in other embodiments from about 0.3 to 0.8. In still other embodiments, the same value may be selected for all coefficients $\lambda$, $\mu$ and $\nu$. This may be considered appropriate when the motions for aligning the substrates and represented in the above embodiments by x, y and r are quite similar, that is, are physically similar and/or are effected by similar mechanical and electronic components. For instance, the x motion and the y motion are substantially identical so that a common coefficient $\lambda$ may be appropriate, whereas the rotation r may involve differently configured actuators, sensors and the like, thereby possibly providing enhanced control results when the coefficient $\nu$ is selected independently from one or more of the other coefficients. It should be noted in this context that the representations of the different motions, such as x, y and r have to be provided in an appropriately normalized fashion such that identical values for the coefficients may be used for the various representatives. If it is, for example, considered appropriate to use the same coefficient for x, y and r, the r variable may be converted in a suitable representation, i.e., the actually used numerical value, that conforms to the representations for the x and y variables. That is, the x and y variables may actually be represented by dimensional quantities with respect to absolute dimensional magnitudes, such as nanometers, Angstrom, and the like, or may be represented by tool internal units, or by other tool parameters, such as current and/or voltage values of respective actuator elements, and the like. In order to provide for correspondingly "normalized" rotational data r, the r representation, i.e., the actual value of the rotation, may be selected so as to obtain a similar effect of the rotation r at the position of the alignment mark 111 compared to a translation (x,y) when a similar value for the x,y and the r representations is used.

In one particular embodiment, the estimated setpoints $\tilde{X}_{second}$, $\tilde{Y}_{second}$, $\tilde{R}_{second}$ for the pre-alignment of the substrate 107 may not be directly employed, but instead may be used to calculate the setpoints $X_{second}$, $Y_{second}$, $R_{second}$ that are then actually supplied by the control unit 112 to carry out the alignment operation. In this way, a smooth behavior of the control operation may be accomplished in that the development of previous alignment procedures is taken into account. For instance, the setpoints $X_{second}$, $Y_{second}$, $R_{second}$ may be calculated in such a way that each of these setpoints is "centered" around the respective estimated setpoint $\tilde{X}_{second}$, $\tilde{Y}_{second}$, $\tilde{R}_{second}$, wherein the deviation from the previously used setpoints $X_{first}$, $Y_{first}$, $R_{first}$ is taken into consideration by, for example, minimizing this deviation. In one embodiment, a corresponding determination of the finally used setpoints $X_{second}$, $Y_{second}$, $R_{second}$ may be achieved by solving a squared minimization approach, which may be written in the form:

$$\min\{u(\tilde{X}_{second}-X_{second})^2+v(\tilde{X}_{second})^2+w(\tilde{X}_{second}-X_{first})^2\}$$

$$\min\{u(\tilde{Y}_{second}-Y_{second})^2+v(\tilde{Y}_{second})^2+w(\tilde{Y}_{second}-Y_{first})^2\}$$

$$\min\{u(\tilde{R}_{second}-R_{second})^2+v(\tilde{R}_{second})^2+w(\tilde{R}_{second}-R_{first})^2\},$$

wherein the problems are to be solved for $X_{second}$, $Y_{second}$, $R_{second}$, respectively, by varying the $\tilde{X}_{second}$, $\tilde{Y}_{second}$, $\tilde{R}_{second}$ to minimize the above expressions. To this end, the $X_{second}$, $Y_{second}$, $R_{second}$ may be replaced by the target values for the setpoints or by any other desired values. Varying of the estimated setpoints $\tilde{X}_{second}$, $\tilde{Y}_{second}$, $\tilde{R}_{second}$ may be achieved by, for example, varying the coefficients $\lambda$, $\mu$ and $\nu$ in the above-explained EWMA approach. The coefficients u, v, w used in minimizing the square sums may be selected so as to appropriately weigh the control behavior with respect to the previously employed setpoints $X_{first}$, $Y_{first}$, $R_{first}$ and the estimated setpoints. For example, the estimated setpoints $\tilde{X}_{second}$, $\tilde{Y}_{second}$, $\tilde{R}_{second}$ may be determined such that the difference to the previous setpoints and to the target setpoints is minimized, wherein the influence of these differences on the setpoints to be used in pre-aligning the substrate 107 is controlled by the coefficients u and w. It is to be noted that the coefficients u, v and w in the above square sums may be selected differently for the respective motions.

It should be noted that the position data x, y, r, the setpoints, and the like are referred to as variables. It is herein intended, unless otherwise set forth in the claims, that a single variable is also to denote a plurality of magnitudes, such as different types of motion, and the like, which may be provided as a vector representation.

Again referring to FIG. 1, a control process in conformity with one of the above embodiments is performed by the control unit 112 to generate a control signal that is supplied to the drive assembly 104 to move the substrate 107 in accordance with the above-established pre-alignment setpoints $X_{second}$, $Y_{second}$, $R_{second}$. Any parameter drift in the tool and/or the substrate 107 compared to the parameter values in one or more of preceding alignment operations may thus be significantly be reduced. Consequently, the substrate 107 is positioned more precisely within the pre-aligmnent window and alignment failures in the subsequent fine alignment are also reduced. In one embodiment, the control unit 112 is configured to process a plurality of substrates 107, for example on a lot basis, with the established pre-alignment setting before establishing a new set of pre-alignment setpoints. The positioning data $x_{first}$, $y_{first}$, $r_{first}$ obtained after aligning the substrate 107 are stored in an appropriate storage medium (not shown), for example provided within the control unit 112, and may be used as "measurement" or input data for one or more substrates to be next processed by the tool 100. Although these input data may not exactly represent the physical position of the substrate 107 after alignment, there is a correlation of the position data and the actual exposure position and therefore an accuracy of the input data substantially corresponds to the accuracy of the fine alignment process. As a consequence, the accuracy of the input data is sufficient to detect relevant tool and/or substrate drifts regarding the pre-alignment procedure, which may then effectively be compensated for by the above-described processes. The embodiments described above may be implemented in the control unit 112 by means of a set of instructions that may be executed by an appropriate logic circuit, or the updated setpoint data that has been calculated in advance for a specified range of input data are stored in a database or library and may be retrieved by the control unit 112 on the basis of the input data obtained by previously processed substrates.

In other embodiments, threshold values may be set for one or more degrees of freedom to monitor the development of the updated setpoints and cause a suitable action upon crossing a corresponding threshold. In this way, for instance, a systematic drift of the tool 100 or the substrates 107 may be recognized and a warning or an invalid machine status may be reported to an operator or a commanding facility management system.

The configuration of the control unit 112 may be realized in many different ways, including, but not limited to, a software program and/or a database installed in a control unit of a conventional alignment tool, a separate computer device connected to the tool 100 by means of a wired and/or wireless communications line, a program in the facility management system, and the like.

As a result, the present invention provides a technique in which the position data of one or more previously aligned substrates are used as "measurement data" for the alignment process of one or more following substrates. In particular embodiments, additional characteristics concerning the substrate, such as the type of substrate, the layers involved in the alignment process, and the like, is taken advantage of, for example, by determining respective target setpoints including one or more of these characteristics, to determine a corresponding control value for, e.g., a pre-alignment process. By centering the position after pre-alignment closer and more reliable around the capture range of the fine alignment process, the overall alignment efficiency may effectively be improved.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of aligning a substrate, the method comprising:

obtaining first position data indicating a position of a first substrate having a predefined characteristic after an alignment act of said first substrate;

determining a setpoint for aligning a second substrate on the basis of said first position data and said predefined characteristic;

aligning said second substrate on the basis of said determined setpoint; and using a linear model relating said first position data and said setpoint to second position data of said second substrate and a previous setpoint used for aligning said first substrate.

2. The method of claim 1, wherein obtaining said first position data includes obtaining an input value of a first variable indicating a motion of said first substrate during the alignment act of said first substrate.

3. The method of claim 1, wherein determining said setpoint of said second substrate includes determining a second variable indicating a motion of said second substrate during an initial phase of aligning said second substrate.

4. The method of claim 1, further comprising obtaining second position data indicating a motion during said aligning of said second substrate.

5. The method of claim 2, wherein said first variable indicates at least a two-dimensional translatory motion.

6. The method of claim 2, wherein said first variable indicates at least one rotary motion.

7. The method of claim 1, further comprising providing a target value for said setpoint, wherein said target value is selected on the basis of said predefined characteristic.

8. The method of claim 7, wherein said setpoint is determined on the basis of said target value.

9. The method of claim 1, wherein each of said first and second position data comprises at least two degrees of freedom and said relation provided by said linear model is devoid of a mixture of said at least two degrees of freedom.

10. The method of claim 1, further comprising defining said characteristic at least on the basis of a first layer, formed on said first and second substrates and including an alignment mark, and a second layer to be formed on said second substrate.

11. The method of claim 1, wherein said position data is determined from a plurality of first substrates.

12. The method of claim 1, wherein a plurality of second substrates are aligned on the basis of said setpoint.

13. A method, comprising:
obtaining an input value of a first variable indicating a motion of a first substrate during an alignment act of said first substrate;
determining a setpoint for a second variable on the basis of said first variable, said setpoint of said second variable determining a motion of said second substrate during an initial phase of aligning said second substrate;
aligning said second substrate on the basis of said determined setpoint; and
using a linear model relating said first input value and said setpoint to a second input value of said first variable indicating the motion of said second substrate and a previous setpoint used for aligning said first substrate.

14. The method of claim 13, further comprising:
obtaining a second input value of the first variable of said second substrate, said second input value indicating a motion during aligning of said second substrate; and
using said second input value for determining a setpoint for a third substrate to be aligned.

15. The method of claim 13, wherein said first variable indicates at least a two-dimensional translatory motion.

16. The method of claim 13, wherein said first variable indicates at least one rotary motion.

17. The method of claim 13, wherein said setpoint is determined on the basis of a predefined characteristic of said first and second substrates.

18. The method of claim 17, further comprising providing a target value for said setpoint, wherein said target value is selected on the basis of said predefined characteristic.

19. The method of claim 18, wherein said setpoint is determined on the basis of said target value.

20. The method of claim 13, wherein said first variable comprises at least two degrees of freedom and said relation provided by said linear model is devoid of a mixture of said at least two degrees of freedom.

21. The method of claim 17, further comprising defining said characteristic at least on the basis of a first layer formed on said first and second substrates and including an alignment mark, and a second layer to be formed on said second substrate.

22. The method of claim 13, wherein said input value is determined from a plurality of first substrates.

23. The method of claim 13, wherein a plurality of second substrates are aligned on the basis of said setpoint.

24. A photolithography tool comprising an automatic alignment system, said automatic alignment system, comprising:
a substrate stage configured to receive and hold in place a substrate;
a drive assembly mechanically coupled to said substrate stage and configured to initiate a motion of said substrate stage in response to a control signal; and
a control unit configured to provide said control signal to said drive assembly, and further configured to establish said control signal on the basis of a predefined characteristic of a substrate to be aligned and position data obtained from one or more substrates previously aligned by said alignment tool.

25. A method of aligning a substrate, the method comprising:
obtaining first position data indicating a position of a first substrate having a predefined characteristic after an alignment act of said first substrate;
determining a setpoint for aligning a second substrate on the basis of said first position data and said predefined characteristic;
aligning said second substrate on the basis of said determined setpoint; and
defining said characteristic at least on the basis of a first layer, formed on said first and second substrates and including an alignment mark, and a second layer to be formed on said second substrate.

26. A method, comprising:
obtaining an input value of a first variable indicating a motion of a first substrate during an alignment act of said first substrate;
determining a setpoint for a second variable on the basis of said first variable, said setpoint of said second variable determining a motion of said second substrate during an initial phase of aligning said second substrate;
aligning said second substrate on the basis of said determined setpoint;
obtaining a second input value of the first variable of said second substrate, said second input value indicating a motion during aligning of said second substrate; and
using said second input value for determining a setpoint for a third substrate to be aligned.

27. A method, comprising:
obtaining an input value of a first variable indicating a motion of a first substrate during an alignment act of said first substrate, wherein said setpoint is determined on the basis of a predefined characteristic of said first and second substrates;

determining a setpoint for a second variable on the basis of said first variable, said setpoint of said second variable determining a motion of said second substrate during an initial phase of aligning said second substrate;

aligning said second substrate on the basis of said determined setpoint; and defining said characteristic at least on the basis of a first layer formed on said first and second substrates and including an alignment mark, and a second layer to be formed on said second substrate.

28. A method of aligning a substrate, the method comprising:

obtaining first position data indicating a position of a first substrate having a predefined characteristic after an alignment act of said first substrate, wherein obtaining said first position data includes obtaining an input value of a first variable indicating a motion of said first substrate during the alignment act of said first substrate, wherein said first variable indicates at least a two-dimensional translatory motion and at least one rotary motion;

determining a setpoint for aligning a second substrate on the basis of said first position data and said predefined characteristic; and aligning said second substrate on the basis of said determined setpoint.

29. The method of claim 28, wherein said at least one rotary motion is in a plane defined by said at least two-dimensional translatory motion.

30. A method, comprising:

obtaining an input value of a first variable indicating a motion of a first substrate during an alignment act of said first substrate, wherein said first variable indicates at least a two-dimensional translatory motion and at least one rotary motion;

determining a setpoint for a second variable on the basis of said first variable, said setpoint of said second variable determining a motion of said second substrate during an initial phase of aligning said second substrate; and aligning said second substrate on the basis of said determined setpoint.

31. The method of claim 30, wherein said at least one rotary motion is in a plane defined by said at least two-dimensional translatory motion.

* * * * *